UNITED STATES PATENT OFFICE.

CARLETON ELLIS, OF MONTCLAIR, NEW JERSEY.

SEMIREDUCED HYDROGENATION-CATALYZER.

1,159,480.  Specification of Letters Patent.  Patented Nov. 9, 1915.

No Drawing. Original application filed December 2, 1913, Serial No. 808,461. Divided and this application filed July 6, 1915. Serial No. 38,308.

*To all whom it may concern:*

Be it known that I, CARLETON ELLIS, a citizen of the United States, and a resident of Montclair, in the county of Essex and State of New Jersey, have invented certain new and useful Improvements in Semireduced Hydrogenation-Catalyzers, of which the following is a specification.

This invention relates to catalyzers and process of making same, adapted for hardening fatty oils by hydrogen addition as well as for other bodies capable of taking up hydrogen under the catalytic process, and relates especially to base metal catalyzer especially nickel catalyzer containing or consisting of certain oxids or sub-oxids of this metal and to composite catalytic material useful for the purpose aforesaid.

The present invention is a division of my copending application Serial No. 808,461, filed December 2, 1913, and also contains matter disclosed in the files of my U. S. Patents Nos. 1,052,469, issued February 2, 1913; 1,067,978, issued July 22, 1913; 1,078,541, issued November 11, 1913; 1,084,202, issued January 13, 1914; and 1,097,308, issued May 19, 1914.

In the hydrogenation of certain oils calling for a relatively low temperature, in order not to impair the flavor or other properties of the oil by over-heating, a catalyzer consisting of a peculiar mixture of metallic nickel and nickel oxid may be employed and these two substances may be intimately incorporated as for example in the following manner: Nickel oxid or hydrate is ignited in a current of hydrogen to reduce such higher oxid preferably to completion. The first third or half of the oxygen may be removed at a temperature of 380–400° C., while the balance of the oxygen may be removed at a temperature of 425–450° C., and upward. Catalyzer prepared at these high temperatures is not particularly active and to improve its activity I may reoxidize the product as by exposing it to air and allowing oxidation to take place. The oxidized material will then be found to reduce with hydrogen more readily than the initial material. For example reduction may take place at a temperature of 325° C., or 330° C., so as to remove about one-half of the oxygen and give an intimately incorporated mixture of metallic nickel combined with nickel oxid or certain of the sub-oxids, which mixture is particularly effective for the treatment of certain oils at relatively low temperatures and low hydrogen pressure.

The degree of reduction of the oxid or hydrate depends to some extent upon the time factor; that is to say, the continued exposure of the material to hydrogen for a long period of time affords a more completely reduced product than when such exposure is for a relatively short period. In the first instance as stated I prefer to convert the higher oxid into the metallic state and reduce completely to the metal, subsequently reoxidizing and then reducing at a lower temperature and of course exposing the material to the hydrogen for a period such as is required to yield the peculiar intimately incorporated mixture of metallic nickel combined with nickel oxid or certain of the sub-oxids.

The process of reduction if desired may be carried out continuously as shown in Letters Patent No. 1,078,541 granted to me on November 11, 1913, according to which method the material as a moving stream passes through a tubular apparatus while hydrogen is passed through the latter in the opposite direction. By regulating the rate of flow of the material with reference to the temperature and velocity of the hydrogen current the degree of reduction may be quite carefully controlled.

The reduced material may be collected in a sealing medium such for example as oil so as to preserve from contact with the air until the catalyzer is required for use, affording a product which may be handled without deterioration.

The semireduction of ordinary nickel oxid or hydrate in the manner described above affords a composition having approximately two atoms of nickel to one atom of oxygen and its empiric or arbitrary formula may be expressed as $Ni_2O$ if the product were to be regarded as an actual compound but as indicated I do not limit myself to these exact proportions of nickel but may vary more or less therefrom according to circumstances and special requirements.

As stated in the applications enumerated above, mixtures of nickel and cobalt oxid may be used when desired and these are useful especially in hardening fish and whale oil. Composite catalytic material may be prepared according to the foregoing containing two or more elements. Thus nickel and cobalt oxid may be partially reduced to obtain what may be termed a partial state of oxidation.

It should be observed that the foregoing method enables the production of a finely-divided metal or semi-oxidized powdered material and that the reduction process involved does not require the use of any oily vehicle for the purposes of such reduction as the raw material may be reduced in the dry state and in a powdered form to the degree desired and without the use of a carrier or supporting agent, although the latter may be used in special forms under certain circumstances.

Besides hydrogen, various other gases and vapors may be employed for reducing purposes and each gas has its specific reducing properties and particular rate of reducing action so that trial may be made in the first instance with the raw catalytic material in hand to determine the velocity of reduction at a given temperature in order to check the reduction at the desired point. Besides hydrogen and water gas, pure carbon monoxid and also ammonia may be employed in some cases the vapor of alcohol and the like. The rate of reduction of the catalyzer is also influenced by the physical character of the raw material and a finely-divided hydrated oxid as a rule reduces more readily than a calcined or ignited oxid so that adjustment of the conditions of reduction should be made with reference to the specific materials at hand as will be understood from the foregoing description.

What I claim is:—

1. The process of preparing a catalyst adapted for hydrogenating the unsaturated portions of fatty material which comprises subjecting a basic compound of nickel to the reducing action of hydrogen whereby partial reduction is effected and in collecting the product in a sealing liquid.

2. The process of preparing a catalyzer adapted for hydrogenating the unsaturated constituents of fatty oils which comprises subjecting ordinary nickel oxid material to the action of hydrogen to form a composition containing about two atoms of nickel to one atom of oxygen and without contact with air, collecting the product in a sealing liquid.

3. The process of making a catalyzer adapted for hydrogenating unsaturated fatty material which comprises partially reducing ordinary nickel oxid material by heating in a dry state with reducing gas and for a predetermined period whereby nickel combined with oxid is obtained and in protecting said material from contact with the air by immersion in a sealing liquid.

4. The process of preparing a catalyzer adapted for hydrogenating the unsaturated constituents of fatty oils which comprises subjecting a reducible basic compound of nickel to the action of hydrogen to form a finely-divided catalytic composition containing nickel and a lower oxid, and without contact with air, collecting the product in a sealing liquid.

5. The process of preparing a catalyzer adapted for hydrogenating the unsaturated constituents of fatty oils which comprises subjecting a reducible compound of a base metal to the action of a reducing gas to form a finely-divided composition comprising the free metal and an oxid thereof, and without contact with air, collecting the product in a sealing liquid.

6. The process of preparing a catalyzer adapted for hydrogenating the unsaturated constituents of fatty oils which comprises subjecting a reducible compound of nickel to the action of a reducing gas to form a finely-divided catalytic composition containing nickel associated with an oxid thereof, and without contact with air, collecting the product in a sealing liquid.

7. A catalyst for hydrogenating unsaturated fatty material which comprises a composition containing nickel and oxygen in the proportion of approximately two atoms of nickel to one atom of oxygen, incorporated in a sealing medium.

8. A catalyst adapted for hydrogenating unsaturated fatty material which comprises nickel and oxygen in the ratio of not less than two atoms of nickel to one atom of oxygen, incorporated in a sealing medium.

9. A catalyst adapted for hydrogenating unsaturated fatty material which comprises active nickel associated with its sub-oxid, incorporated in a sealing medium.

10. A catalyzer adapted for oil hardening comprising a dry-reduced, finely-divided, intimately-incorporated active mixture of nickel combined with its sub-oxid, incorporated in a sealing medium.

11. A catalyzer adapted for oil hardening consisting of a catalytically-active dry-reduced, finely-divided, intimately-incorporated composition of nickel combined with at least one of its sub-oxids, incorporated in a sealing medium.

12. A catalytic body comprising a partially reduced nickel oxid containing nickel and oxygen in about the proportions represented by the formula $Ni_2O$, said material being incorporated in a sealing medium.

13. A method of producing a catalyst which comprises first substantially completely reducing an oxygen compound of a metal of the nickel group to metal, second oxidizing said metal to oxid, and third reducing the oxid to a sub-oxid, at a temperature materially lower than that employed in the first step.

14. A method of producing a catalyst which comprises first substantially completely reducing an oxygen compound of a metal of the nickel group to metal, second oxidizing said metal to oxid, third reducing the oxid to a sub-oxid, at a temperature materially lower than that employed in the first step, and fourth without permitting access of air to the product incorporating the same in a sealing medium.

CARLETON ELLIS.